United States Patent [19]
Kemper

[11] Patent Number: 5,744,032
[45] Date of Patent: Apr. 28, 1998

[54] EASILY REMOVABLE OIL FILTER ATTACHMENT

[76] Inventor: John Joseph Kemper, 5512 Sara Dr., Torrance, Calif. 90503

[21] Appl. No.: 633,198

[22] Filed: Apr. 16, 1996

[51] Int. Cl.$^6$ ............................................. B01D 35/00
[52] U.S. Cl. .................. 210/238; 210/443; 210/DIG. 17; 81/124.7
[58] Field of Search .................. 210/238, DIG. 17, 210/232, 443; 81/124.7

[56] References Cited

U.S. PATENT DOCUMENTS

| | | | |
|---|---|---|---|
| 4,266,452 | 5/1981 | Crist | 81/124.7 |
| 5,024,760 | 6/1991 | Kemper | 210/DIG. 17 |

FOREIGN PATENT DOCUMENTS 2107751  8/1972  Germany ............................. 81/124.7

*Primary Examiner*—Matthew O. Savage

[57] ABSTRACT

The addition of a bracket type fin attachment to the current design of internal combustion engine oil filters to enhance removal of the oil filter, at replacement time, is the advantage of my new design. This attachment can be molded into the external wall of the oil filter, in addition to many other manufacturing methods, in order to achieve this basic idea. The molded attachment can be sold as a separate unit, similar to the oil filter wrench, although much different in design, and can be reused. The Easily Removable Oil Filter Attachment is for use with all sizes and types of engine oil filters, including: automobiles, boats, trucks, motorcycles and airplanes.

9 Claims, 1 Drawing Sheet

EASILY REMOVABLE OIL FILTER ATTACHMENT

FIELD OF THE INVENTION

This invention relates to the replacement oil filters used on all motor vehicle, boat and private aircraft engines. Most engine manufacturers recommend replacing the oil filter every 6,000 miles. The oil filter removes carbon and other foreign material from the circulating lubrication oil to reduce friction and prolong engine life.

Current oil filters require the use of either a strap type metal wrench or a huge socket wrench attachment which plugs into a socket wrench. Most oil filters have socket wrench indentations formed into the filter body.

The strap type wrench requires more room in the engine compartment in order to accomodate the wrench. The socket type wrench attachment also requires more room to accomodate the socket wrench. My invention requires no wrench and may be considered a wrench in itself. However, since a wrench usually constitutes a long-handled device, I am referring to my invention as an attachment, to be more precise.

My Easily Removable Oil Filter Attachment requires less engine compartment space then other oil filter removing tools. This attachment may also be less expensive to produce since plastic can also be used as a manufacturing material. In many situations, my invention will also provide better leverage during the oil filter removal process.

This invention does not change any of the inner filtration apparatus, only the method of oil filter removal. A tool is not used to add a new oil filter since high torque is not recommended. This attachment is for use with all designs and sizes of internal combustion engine oil filters.

DESCRIPTION OF PRIOR ART

There is no previous design quite like the Easily Removable Oil Filter Attachment—excepts for the Easily Removable Oil Filter Patent (U.S. Pat. No. 5,024,760) which is my own previous patent.

This design differs from the Atkins (U.S. Pat. No. 4,364,829) design in that the amount of material is substantially reduced, the shape of the attachment is completely different, there are no hinges in my design, and no modification to current oil filters are necessary to use this attachment.

This design differs from the Krauss (U.S. Pat. No. 4,865,727) design in that no extra filter container is required and is very much different in regards to outer body design.

This design differs from the Cooper (U.S. Pat. No. 4,465,595) design, in that no screwdriver is required to use this attachment and the brackets are shaped much differently, and it is not a screw on leak reducer as in the Cooper patent.

This design is an exact match to my own previous patent for the Easily Removable Oil Filter (U.S. Pat. No. 5,024,760), with the exception that it can be sold as a separate unit. Although my current patent does cover this idea, it does not clearly indicate its use or marketability as a separate item. When the attachment is applied to an oil filter, it does become an "Easily Removable Oil Filter" for that moment.

My new design is unique to all past oil filter attachments and oil filter wrenches in that it enhances the filter removal process by providing gripping brackets, similar to the wing nut idea, eliminating the need for other types of removal tools. (With the exception of my own patent as stated above).

SUMMARY OF THE INVENTION

The object is quite simple, to provide for the removal of internal combustion engine oil filters by enhancing the design of current oil filter removal tools. This will make periodic oil changes less expensive and easier, and may encourage drivers and mechanics to change oil filters more often. Cleaner oil increases gas mileage in addition to the life expectancy of the internal combustion engine. This will help decrease air pollution.

Figure 1:
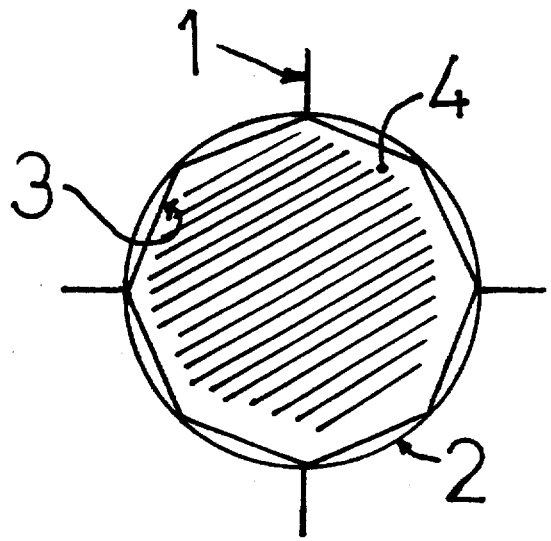
FIG. 1-Top View.
Figure 2:
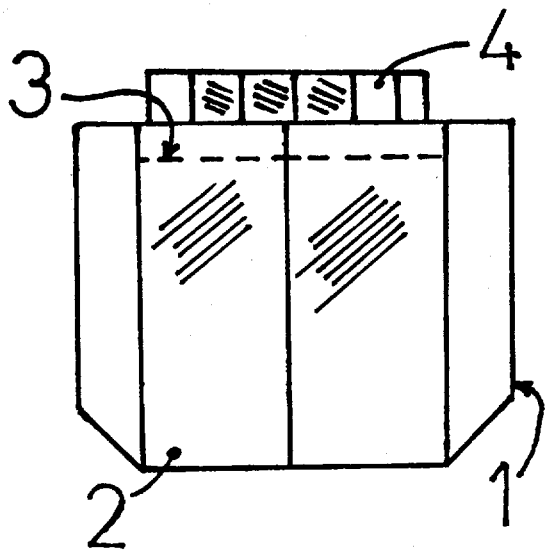
FIG. 2-Side View.
Figure 3:
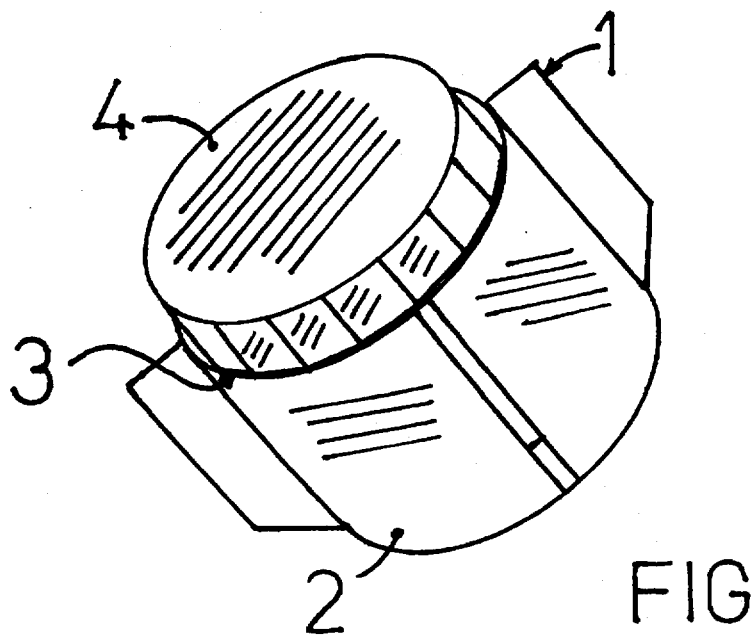
FIG. 3-Three-Dimensional View.

Within each of the figures, the numbered parts are as follows:
Number 1-Gripping edge of the bracket attachment.
Number 2-The Attachment body itself.
Number 3-Edge of Attachment that contacts filter body.

DESCRIPTION OF THE PREFERRED EMBODIMENT

Most replaceable oil filters are cylindrical in shape and varying in length and diameter, usually in proportion to the engine size it is used on. This attachment is for use with all sizes of oil filters and has no relationship to the inner filtration design.

As shown in the drawing Figures, an annular attachment body 2 coaxially surrounds a longitudinal axis and includes first and second open ends. The body defines a length between the first and second open ends and includes a peripheral exterior surface extending from the first open end to the second open end. The body has a first peripheral interior surface portion adjacent the first open end and a second peripheral interior surface portion adjacent the second open end. The first peripheral interior surface portion is cylindrically shaped and is adapted to engage a cylindrical peripheral outer surface of a spin-on oil filter 4 well known in the art, and the second peripheral interior surface portion 3 has a polygonal shape adapted to engage a polygonal peripheral outer surface the known spin-on oil filter. A plurality of ribs 1 are fixedly attached to the peripheral exterior surface of the annular attachment body and extend from the first open end to the second open end in a direction substantially parallel to the longitudinal axis of the body.

The attachment brackets 1 can vary in size from approximately ½ to 1 inch away from the attachment body 2 with the length of the brackets the same as the attachment body length. The brackets may be tapered over ¼ to ⅓ of the length of said anular attachment body on the bottom side to enable use in tight engine compartments where the filter is up against the engine itself.

The amount of brackets can vary from 1 to 30, preferably 4, and will usually be equally spaced around the circumference of the attachment.

This attachment can be manufactured in a variety of ways, using plastic or metal, in order to achieve its form. The preferred process is plastic injection molding. The attachment body can molded to the outer surface of said oil filter housing or can be molded separately from the oil filter itself, as a separable removal tool.

Any suitable material, metals and plastics included, can be used to form this attachment. The preferred material is rigid high temperature plastic since some filters are removed from hot engines.

Although this invention has been disclosed in terms of preferred embodiment, it should be understood that numerous modifications could be made thereto without departing from the true spirit and scope thereof as defined by the following claims.

I claim:

1. An oil filter hi combination with an oil filter attachment comprising:

an annular attachment body coaxially surrounding a longitudinal axis and including first and second open ends, said body defining a length between said first and second open ends, wherein said body includes a peripheral exterior surface extending from said first open end to said second open end, said body having a first peripheral interior surface portion adjacent said first open end and a second peripheral interior surface portion adjacent said second open end, wherein said first peripheral interior surface portion is cylindrically shaped and is adapted to engage a cylindrical peripheral outer surface of said oil filter, and wherein said second peripheral interior surface portion has a polygonal shape adapted to engage a polygonal peripheral outer surface said oil filter, and a plurality of ribs fixedly attached to the peripheral exterior surface of said annular attachment body, wherein said ribs extend from said first open end to said second open end in a direction substantially parallel to said longitudinal axis, and wherein said ribs have a length that is substantially equal to the length of said body whereby the oil filter attachment and oil filter can be used in engine compartments having limited space.

2. The combination according to claim 1, wherein said annular body and said plurality of ribs are formed of plastic.

3. The combination according to claim 1, wherein said annular body and said plurality of ribs are formed of metal.

4. The combination according to claim 1, wherein ends of said ribs adjacent said first open end are tapered such that a height of said ribs increases in a direction from said first open end to said second open end.

5. The combination according to claim 4, wherein said ribs taper over ¼ to ⅓ of the length of said annular attachment body.

6. The combination according to claim 1, wherein a number of said ribs ranges from 1 to 30.

7. The combination according to claim 1, wherein said attachment body is molded to the outer surface of said oil filter.

8. The combination according to claim 1, wherein said attachment body is separable from the outer surface of said oil filter.

9. The combination according to claim 1, wherein said ribs extend to a height equal to ½ to 1 inch radially outwardly from the peripheral exterior surface of said body.

* * * * *